No. 12,524. REISSUED AUG. 28, 1906.

A. P. BRUSH.

SYSTEM OF SPLASH LUBRICATION.

APPLICATION FILED APR. 13, 1906.

Witnesses
O. B. Baenziger
E. M. Spielberg.

Inventor
Alanson P. Brush
By Newell S. Wright.
His Attorney.

UNITED STATES PATENT OFFICE.

ALANSON P. BRUSH, OF DETROIT, MICHIGAN.

SYSTEM OF SPLASH LUBRICATION.

No. 12,524. Specification of Reissued Letters Patent. Reissued Aug. 28, 1906.

Original No. 730,738, dated June 9, 1903. Application for reissue filed April 13, 1906. Serial No. 311,594.

*To all whom it may concern:*

Be it known that I, ALANSON P. BRUSH, a citizen of the United States, residing at Detroit, county of Wayne, State of Michigan, have invented a certain new and useful Improvement in Systems of Splash Lubrication, of which the following is a specification, reference being had to the accompanying drawings, which form a part of this specification.

My invention has reference to a system of splash lubrication for multiple-cylinder engines, permitting an engine to be set at an angle from a horizontal without any cylinder of the engine having an excess or lack of oil and with a single oil-feed for all of the cylinders.

To this end it consists of the construction hereinafter described and claimed, and illustrated in the accompanying drawings, in which—

Figures 1, 4, 5:
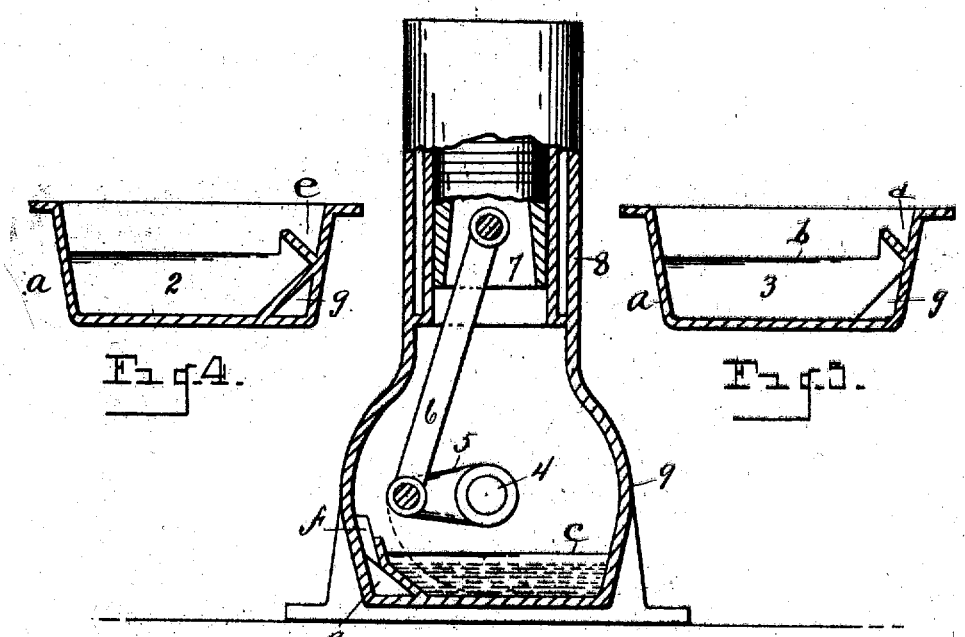
Figure 2:
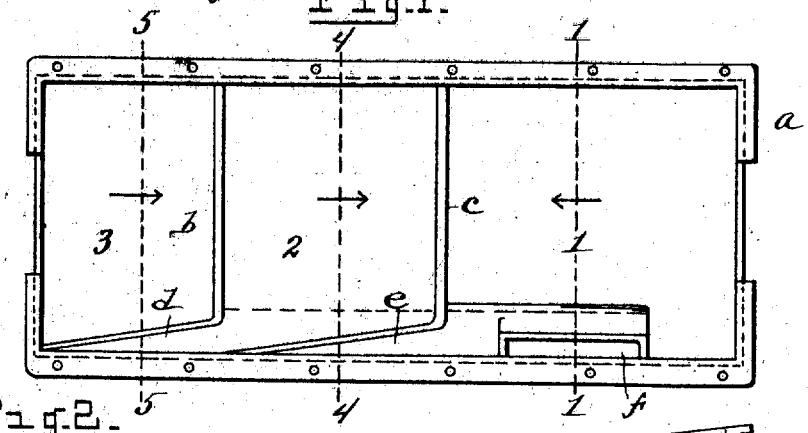
Figure 3:
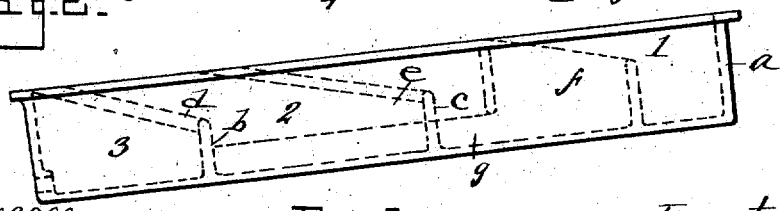

Figure 1 is a view in vertical cross-section on a line similar so far as the base is concerned to 1 1, Fig. 2, looking in the direction of the arrow in Fig. 2, but showing a modification of my invention. Fig. 2 is a view in plan of an oil-pan embodying features of my invention. Fig. 3 is a view in side elevation, showing the interior construction of the oil-pan in dotted lines, one end being higher than the other. Fig. 4 is a vertical cross-section on the line 4 4, Fig. 2, looking in the direction of the arrow. Fig. 5 is a similar section on the line 5 5, Fig. 2, looking in the direction of the arrow.

The drawings herewith submitted show an oil-pan for a triple-cylinder engine and in connection with parts of an engine. As herewith illustrated, I carry out my invention as follows:

In the drawings, *a* represents an oil-pan, the pan being constructed with a separate pit for each crank of the engine, said pits being indicated by the numbers 1, 2, and 3 and separated by suitable walls *b c* across the pan. Each pit is provided with a trough or channel on the side toward which the crank moves when at its lowest position.

In Fig. 1 the numeral 4 denotes a crank-shaft; 5, the crank-arm; 6, the connecting-rod leading to the piston 7 of the cylinder 8. The frame of the engine is indicated at 9, with which the pan *a* is engaged. These parts of an engine are shown to illustrate more fully my present invention.

Beginning at one end of the oil-pan, as with the pit 3, said pit is shown provided with an angular trough or channel *d*, leading along the side of the pan and discharging at its lower end over the wall *b* into the pit 2. The pit 2 is similarly shown provided with an angular trough or channel *e* on the side of the pan, discharging in a similar manner over the wall *c* into the pit 1. The pit 1 is provided with an elongated opening *f* into a conduit *g*, which is closed at its end in pit 1 and leads back and discharges into pit 3. It will be evident that by placing the trough and conduit on the side toward which the cranks move in their lowest position the greater part of the oil being thrown by them against the side of the frame will be directly over said troughs and the opening into the conduit and will descend thereinto. If a multiple-cylinder engine having splash lubrication be set at an angle as indicated by the location of the oil-pan in Fig. 3, it will be apparent that the cylinder at the lower end would have an excess of oil (but for the provisions of my invention) when the cylinders toward the upper end had sufficient oil or that if the lower cylinder had only sufficient oil the others would have an insufficient supply or none at all; but having the pan constructed as herein described this liability is entirely eliminated, inasmuch as the greater part of the oil thrown from the pit 3 by the crank would be caught by its trough and discharged over into pit 2, and similarly the oil thrown by the crank-arm dipping into pit 2 would be caught by its trough and carried into pit 1, while the greater part of the oil thrown by the crank dipping into pit 1 will be caught by the opening *f* and carried by the conduit *g* back into pit 3, the operation being of course continuous and allowing an engine to be set in any position from a level to a point where the angular channels and conduit above described would themselves become level. It will also be obvious that the pits 1 and 3 are typical of pits at opposite ends for the cranks of any multiple-cylinder engine and that the pit 2 is typical of any number of intermediate pits to correspond with multiple-cylinder engines of any desired number. The oil-pan may rest level or it may be inclined without the possibility of any crank having a greater supply of oil than another. I do not limit my invention, however, to the employment of an oil-pan constructed as hereinbefore described, as the channels and conduit need not necessarily be formed in a separately-constructed oil-pan, but might be formed as a part of a multiple-cylinder engine-frame having splash lubrication. The same arrangement of separate pits for the cranks, with their channels and conduits, might be formed in the base of any multiple-cylinder engine and might be cast into the frame itself of the engine or otherwise formed within the scope of my invention, as shown in Fig. 1. It is obvious that such provision is particularly useful for marine engines when it is desirable to set the front end of the engine higher than the rear end.

The oil, obviously, may be introduced anywhere in the system of pits, the action hereinbefore described at once equalizing the amount of oil for each cylinder.

What I claim as my invention is—

1. In a multiple-cylinder engine provided with plural cranks, the provision of a series of pits, one for each of the cranks, and channels to carry the oil from the pit at one end of the series into the pit at the other end of the series, and from the last-named pit into the remaining pits.

2. In a multiple-cylinder engine provided with plural cranks the provision of a series of pits one for each of the cranks, the corresponding side walls of said pits provided with angularly-arranged channels to carry the oil from one end pit into the opposite end pit and from the last-named pit into the remaining pits.

3. In a multiple-cylinder engine the provision of separate pits for the cranks, the walls of said pits on the side toward which the cranks move when at the lowest position provided with channels to carry the oil from one end pit into the opposite end pit and from the last-named pit into the remaining pits.

4. In a multiple-cylinder engine the provision of separate angularly-arranged pits for the cranks, the walls of said pits on the side toward which the cranks move when at their lowest position provided with angularly-arranged channels to carry the oil from one end pit into the opposite end pit, and from the last-named pit into the remaining pits.

5. In a multiple-cylinder engine the combination of an engine-frame provided with an oil-reservoir, a crank-shaft provided with a crank for each cylinder dipping into said reservoir, said reservoir provided with a separate pit for each crank, said pits provided with channels to carry the oil from one end pit into the opposite end pits and from the last-named pit into the remaining pits.

In testimony whereof I have signed this specification in the presence of two subscribing witnesses.

ALANSON P. BRUSH.

Witnesses:
N. S. WRIGHT,
E. L. SCHWARTZ,